United States Patent Office 3,141,861
Patented July 21, 1964

3,141,861
EPOXIDE RESIN COMPOSITIONS
Keith Beadsmore Smith and Morice William Thompson, both of Maidenhead, England, assignors to Imperial Chemical Industries Limited, London, England, a corporation of Great Britain
No Drawing. Filed Sept. 26, 1960, Ser. No. 58,211
Claims priority, application Great Britain Sept. 28, 1959
9 Claims. (Cl. 260—45.5)

This invention relates to epoxide resin compositions. In particular, the invention relates to can-stable epoxide compositions which may be cured on heating, and to a method of curing an epoxide resin composition by heating, which obviates the necessity for the addition, immediately prior to curing, of a curing agent.

Various curing agents are known for use in epoxide resin compositions but those known curing agents, which have been can-stable, that is to say, they do not gel or solidify unduly rapidly in the container or can, have required substantially higher curing temperatures and longer periods of heating than compositions containing the curing agents disclosed in the present invention. In addition, known curing agents do not produce the same degree of cure, and hence ultimate resin strength, as do those used in this invention.

The present invention provides a can-stable composition comprising an epoxide resin and a betaine as hereinafter defined, which composition may be cured by heating.

These compositions are satisfactorily cured by heating to between 100° C. and 250° C. for periods varying from a few minutes to a few hours.

Preferably the weight of betaine present in the composition is between 1% and 10% by weight of epoxide resin in the composition. However, if a longer period of curing is acceptable as little as 0.1% of betaine may be used in the composition, for example in a potting compound for use with electrical equipment when 15 hours would not be an excessive time.

The preferred weight of betaine present in compositions for use as coating compositions, in which fairly rapid cure is desirable, is between 1% and 4% by weight of epoxide resin.

The present invention also provides a method of curing epoxide resins by mixing with a betaine as hereinafter defined and then heating the mixture to cure the epoxide resin.

The term "betaine" as used in this specification refers to compounds having the general formula:

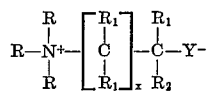

in which $x$ represents any whole number between 0 and 9 inclusive, Y represents a carboxylic, sulphonic or phosphoric acid group, R represents an alkyl, aryl or heterocyclic groups $R_1$ represents hydrogen, or an alkyl, aryl or heterocyclic group and $R_2$ represents hydrogen, or an alkyl, aryl or heterocyclic group or Y, or salts thereof.

The preferred acidic group in the betaines is a carboxylic acid group.

Preferably the molecular weight of the betaine is less than 600.

Betaine salts, particularly those of organic acids, provide compositions having especially desirable properties in that compositions containing them cure more readily, are more stable and less hygroscopic than other betaines.

The commercially available betaines are not always of satisfactory purity for use in this invention and their use may reduce the can-stability of the compositions due to the presence of tertiary bases. Betaines may be made by various methods and the following processes may be conveniently used to prepare satisfactorily pure betaines for use in this invention.

According to one method, 1 mole of sodium chloracetate was heated at 70°–80° C. for several hours with 1 mole of a tertiary amine in alcohol or aqueous alcohol. The solution was evaporated to dryness and the residue of sodium chloride and betaine extracted with alcohol, filtered to remove sodium chloride, and the betaine precipitated out of solution, either with ether or acetone. Alternatively, if the betaine was appreciably soluble in ether the alcohol solution was diluted with several volumes of water and this solution extracted with ether to remove any unreacted tertiary base, and the aqueous solution taken down to dryness under vacuum.

Betaines which may be made by this method include N:N:N-trimethyl betaine (melting point 293° C. decomposed), N:N:N-triethyl betaine (melting point 170° C. decomposed), N-cetyl-N:N-dimethyl betaine, the betaine from the tertiary amine made from coconut fatty acids, N-octadecyl-N:N-dimethyl betaine (melting point 127° C. decomposed), N-phenyl-N:N-dimethyl betaine (melting point 120° C. decomposed) and pyridine betaine (melting point 150° C. decomposed).

According to another method 1 mole of β-propiolactone was reacted with 1 mole of tertiary amine in water, ether, acetonitrile, or mixtures of these solvents at 10°–40° C. according to the methods of Gresham et al., J.A.C.S. 73, 3168. Betaines made by this method include N-octadecyl-N:N-dimethyl propiobetaine, N-octadecyl-N:N-dimethyl betaine (melting point 129° C.), the betaine from the tertiary base from coconut fatty acids, N:N:N-trimethyl betaine, N:N:N-trihydroxy ethyl betaine, N-benzyl-N:N-dimethyl propiobetaine, N-hexyl-N:N-dimethyl propiobetaine (melting point 97° C.) and N:N-dimethyl-N-dodecyl propiobetaine.

In a further method of preparation of a betaine, α-bromostearic acid, (melting point 60.3° C.), made from stearic acid by bromination of stearic acid in the presence of phosphorous trichloride, was neutralised with sodium carbonate and then refluxed with an excess of trimethylamine in ethanol for 12 hours. The sodium bromide was filtered off and the betaine obtained from the alcoholic solution.

Alternatively, 11-bromo-indecanoic acid was neutralised by sodium carbonate and then refluxed with excess alcoholic trimethylamine for 12 hours. After filtering off the sodium bromide, the betaine was obtained from the alcoholic solution.

Another form of betaine was prepared as follows. 1 mole of maleic acid, in ether, was mixed with 1 mole of tertiary base in ether. The resultant salt which precipitated was filtered and washed with ether. This salt was heated to just above its melting point (about 100–110° C.) and held at that temperature for a few minutes. This caused the salt to re-arrange to the betaine.

By this method N-stearyl-N:N-dimethyl betaine and isoquinoline betaine were obtained (see Maleic Anhydride Derivatives by Flett and Gardner, page 121).

It is desirable for the betaine to be soluble in the epoxide resin, or resin solution, and the attached groups should be introduced to assist this solubility. Even if the betaine is not soluble, providing it is finely dispersed, satisfactory curing will be obtained.

The curing effect of the betaine is derived from the quaternary nitrogen atom, hence the quantity of betaine in the compositions will be dependent on the molecular weight of the betaine molecule and the amount of epoxide present. The curing effect is assisted by small amounts of water or alcohols.

Suitable solvents for use in these compositions include those normally used with epoxide resins, for example, aromatic and ketonic solvents.

In addition, solventless compositions may be prepared using liquid epoxide resin and betaines.

Coating compositions containing the epoxide resins and betaines according to the present invention may also contain various other film-formers such as alkyd resins, nitrogen resins such as urea formaldehyde, melamine formaldehyde, phenol aldehyde resins, acrylic resins, vinyl resins and polyamide resins.

The preferred betaines for use in the present invention include N:N:N-trimethyl betaine, N-octadecyl N:N-dimethyl betaine, N-cetyl-N:N-dimethyl betaine and N-octadecyl N:N-dimethyl propiobetaine. For maximum can-stability salts of these betaines with organic acids should be used. These betaines have particularly suitable properties for use in coating compositions of the orthodox type since they are soluble in the solvents normally used in such compositions. Betaines with low molecular weights are soluble in water and can be used in water-borne epoxide compositions.

Any epoxide resin including any of the film-forming epoxide resins at present on the market may be employed in the present invention.

Depending on the type of epoxide used, the resulting cured material will be thermoplastic or thermosetting. The various compositions provided by this invention may be used as potting compounds for electrical apparatus, coating composition and in pigmented stoving finishes. The pigments may be dispersed by any of the known procedures and the coatings applied in the orthodox manner.

Coating compositions containing epoxide resins and betaines according to this invention are stable for some months under normal storage conditions.

In the following examples epoxide resins sold under the registered trademark "Epikote" were used. These resins are obtained by condensation of epichlorohydrin and diphenylolpropane and have the general formula

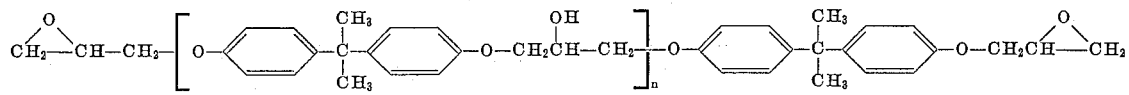

The constants of the various resins are as follows:

| No. | Molecular weight | Melting Point, ° C. | Epoxy Equivalent | Hydroxyl Value |
|---|---|---|---|---|
| 828 | 390 | 8–12 | 0.54 | 0.08 |
| 834 | 550 | 20–28 | 0.38 | 0.18 |
| 1001 | 1,000 | 64–76 | 0.21 | 0.32 |
| 1007 | 3,800 | 121–133 | 0.05 | 0.36 |

Various resins and betaines were mixed and stored for 3 months. No serious increase in viscosity was apparent after this period. Later, samples were heated as shown below. The mixtures cured in the times stated formed cured resins as set out under "Result."

| | Resin | Curing Agent | Temp., ° C. | Time | Result |
|---|---|---|---|---|---|
| 1 | 834 | 1% N:N:N-trimethyl betaine. | 155 | 1.5 hrs | Brittle resin. |
| 2 | 834 | 2% N:N:N-trimethyl betaine. | 155 | 1 hr | Do. |
| 3 | 834 | 2% N-octadecyl-N:N-dimethyl betaine. | 155 | 20 mins / 2 hrs | Hard resin. / Very hard resin. |
| 4 | 834 | 1% N:N:N-trimethyl betaine + 2% N-octadecyl-N:N-dimethyl betaine. | 155 | 45 mins | Do. |
| 5 | 834 | 4% N-octadecyl-N:N-dimethyl propiobetaine. | 155 | 30 mins | Hard, colourless resin. |
| 6 | 834 | 2% dimethylaniline betaine. | 240 | 4 hrs | Brittle resin (dark). |
| 7 | 834 | 2% pyridine betaine. | 155 | 8 hrs | Brittle resin. |
| 8 | 1 834 | 2% N:N:N-trimethyl betaine +2% N-octadecyl betaine. | 155 | 1 hr | Hard resin. |
| 9 | 828 | ----do---- | 155 | 1.5 hrs | Do. |
| 10 | 1001 | ----do---- | 155 | 1.5 hrs | Do. |
| 11 | 1007 | ----do---- | 155 | 3 hrs | Soft resin. |
| 12 | 834 | 2% N-stearyl N:N-dimethyl undecyl betaine. | 150 | 4 hrs | Brown, tough resin. |
| 13 | 834 | 4% N-benzyl-N:N-dimethyl-2-isopropyl betaine. | 150 | 24 hrs | Slight cure. |
| 14 | 834 | 4% N:N:N-trimethyl propiobetaine. | 150 | ½ hr | Pale yellow hard resin. |
| 15 | 834 | 2% N-benzyl-N:N-dimethyl propiobetaine. | 150 | 1 hr | Pale yellow tough resin. |
| 16 | 834 | 2% N:stearyl-N:N-dimethyl betaine. | 150 | 1 hr | Hard pale-yellow resin. |

1 50% soln. in xylene.

The following betaine salts have also been prepared and they also cure epoxide resins as shown below:

| | Resin | Curing Agent | Temp., ° C. | Time, hrs. | Result |
|---|---|---|---|---|---|
| 17 | 834 | 2% Hydrochloride of N:N:N-trimethyl propiobetaine. | 150 | 1 | Hard pale yellow resin. |
| 18 | 834 | 1% Hydrochloride of N:N-dimethyl N-octadecyl propiobetaine. | 150 | 4 | Brittle resin. |
| 19 | 834 | 1% Acetate of N:N-dimethyl N-octadecyl propiobetaine. | 150 | 2 | Do. |
| 20 | 834 | 2% Phosphate of N:N-dimethyl N-octadecyl propiobetaine. | 150 | 4 | Brittle soft resin. |
| 21 | 834 | 2% Oxalate of N:N-dimethyl N-octadecyl propiobetaine. | 125 | 4 | Hard brittle resin. |
| | | | 150 | 1 | Hard tough resin. |

Additions of organic acids to the epoxide resin/betaine compositions improved can stability even more. The amount of acid added is preferably sufficient to form the appropriate betaine salt. Conveniently the acid may be present in a copolymer as shown in the next two examples in which all parts are by weight.

*Example 22*

A 100 parts of acrylic acid/vinyl toluene copolymer were blended with 20 parts of "Epikote" 834 and with 2 parts N:N:N-trimethyl betaine and 2 parts N-octadecyl betaine and cured on a panel to a hard, flexible, resin by heating at 127° C. for half an hour. A similar result was obtained by heating at 155° C. for half an hour. This example shows that satisfactory curing is obtainable under varied conditions with this type of curing agent.

*Example 23*

A pigmented coating composition was prepared using as binder a composition containing vinyl toluene 16.5 parts, ethyl acrylate 4.5 parts, acrylic acid 2 parts and an epoxide resin 4 parts ("Epikote" 834). The pigment used was titanium dioxide 26 parts and solvents were added. 0.3% of N-octadecyl betaine (calculated on the total composition) was added to the composition and the composition did not shown a serious increase in viscosity over a period of 2 months when stored at 40° C.

Further solvent was added to reduce this composition to spraying viscosity (a total of 45 parts) and the composition sprayed onto steel panels and stoved at 165° C. for 30 minutes gave a hard, tough film of good colour.

*Example 24*

348 parts of polyamide-imide resin (based on the Diels-Alder adduct of β-eleostearic acid reacted with hexamethylene diamine) and 35 parts of "Epikote" 834 resin were mixed with 0.7 part of N-octadecyl-N:N-dimethyl propiobetaine. Films prepared from this composition were stoved on steel panels at 150° C. for half an hour and a hard solvent resistant film was obtained. This film was heated to 250° C. for 24 hours without harmful effect.

*Example 25*

To prepare N-dodecyl-N:N-dimethylammonium ethane-2-sulphonate, sodium - 2 - bromoethane sulphonic acid (made by reacting sodium sulphite and ethylene dibromide according to the method of Organic Synthesis, volume II, page 558) 17 parts, dodecyl dimethylamine 20 parts and 95% ethyl alcohol 500 parts were refluxed for 18 hours. The alcohol was evaporated down to quarter bulk and then filtered free from sodium bromide. The filtrate was diluted with acetone precipitating out N-dodecyl - N:N - dimethylammonium ethane-2-sulphonate. This compound had a melting point of about 250° C. and 2% by weight of this compound was mixed with "Epikote" 834 resin and after heating for 24 hours at 150° C. produced a hard brittle resin.

*Example 26*

To prepare N-dodecyl-N:N-dimethylammonium propane-3-sulphonate, sodium - 3 - bromopropane sulphonic acid 7 parts (made from sodium sulphite and propylene dibromide according to the method of Organic Synthesis, volume II, page 558) was refluxed in 95% ethanol with 7 parts of N-dodecyldimethylamine. The product was isolated as in Example 25. The product had a melting point below 250° C. and contained no bromide. 2% of this product when heated at 150° C. for 24 hours in "Epikote" 834 resin gave a hard brittle resin.

*Example 27*

A pigmented composition was prepared using as binder a composition containing styrene 13.5 parts, ethyl acrylate 10 parts, acrylic acid 1.5 parts, "Epikote" 834 resin 3.5 parts. The pigment used was titanium dioxide 26 parts and solvents were added. 0.3 part of N-octadecyl N:N-dimethyl propiobetaine were added to the composition. Similar storage characteristics to those of Example 23 were found. A sample of this composition was reduced to spraying viscosity (about 25 seconds in a British Standard No. 4 cup) and sprayed onto a steel panel. The coated panel was stoved for 30 minutes at 165° C. and a hard tough, glossy film of good colour was obtained.

*Example 28*

4 parts of "Epikote" 834 resin were mixed with 1 part of a glycerol/glycol terephthalate/lauric acid alkyd resin and with 4% by weight of epoxide resin of octadecyl dimethyl propiobetaine. This composition was stored for 2 months at 18° C. No appreciable increase in viscosity was apparent after this time. An armature was impregnated with this composition and stoved for 4 hours at 150° C. A hard, clear, tough covering was formed on the armature.

*Example 29*

Example 28 was repeated using the same quantity of octadecyl dimethyl betaine as curing catalyst and similar results were obtained.

*Example 30*

2 parts of a phenol aldehyde resin in solution in xylol (65% solids) and 1 part of "Epikote" 1001 resin together with 3% by weight of the epoxide resin of octadecyl dimethyl propiobetaine were mixed and stored for 4 weeks at 18° C. No appreciable increase in viscosity was noted after this time and a panel coated with this composition was heated at 165° C. for 1 hour. A hard, tough, glossy film was obtained.

What we claim is:

1. A can-stable composition which may be cured by heating comprising an epoxide resin obtained by condensation of epichlorohydrin and diphenylolpropane which has the formula

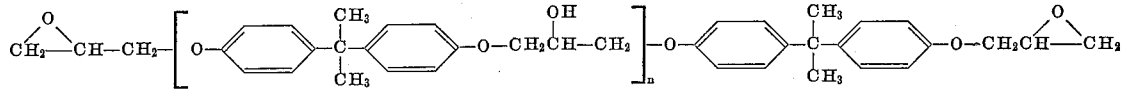

in which $n$ is an integer with about 0.1 to 10% by weight, based on the weight of the epoxide resins of betaine which has the formula

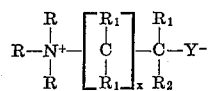

in which $x$ represents a whole number between 0 and 9 inclusive, Y represents a member of the group consisting of carboxylic, sulfonic and phosphoric acid groups, R represents a member of the group consisting of alkyl, aryl and heterocyclic groups, $R_1$ represents a member of the group consisting of hydrogen, alkyl, aryl and heterocyclic groups and $R_2$ represents a member of the group consisting of hydrogen, alkyl, aryl heterocyclic and groups corresponding to Y, and the salts thereof.

2. A composition as claimed in claim 1 in which the molecular weight of the betaine is less than 600.

3. A can-stable coating composition comprising a composition as claimed in claim 1 in which the weight of betaine is between 1% and 4% of the weight of the epoxide resin.

4. A coating composition as claimed in claim 1 containing also an acrylic resin as a film former.

5. A composition as claimed in claim 1 in which the betaine is N:N:N-trimethyl betaine.

6. A composition as claimed in claim 1 in which the betaine is N-octadecyl-N:N-dimethyl betaine.

7. A composition as claimed in claim 1 in which the betaine is N-cetyl-N:N-dimethyl betaine.

8. A composition as claimed in claim 1 in which the betaine is N-octadecyl-N:N-dimethyl propiobetaine.

9. A composition as set forth in claim 1 containing also a dispersed pigment.

References Cited in the file of this patent

UNITED STATES PATENTS

| | | |
|---|---|---|
| 2,506,486 | Bender et al. | May 2, 1950 |
| 2,891,017 | Kern et al. | June 16, 1959 |
| 3,005,793 | Wagner | Oct. 24, 1961 |
| 3,048,552 | Fang | Aug. 7, 1962 |